No. 688,273. Patented Dec. 3, 1901.
J. E. WARD.
NUT LOCK.
(Application filed May 14, 1901.)
(No Model.)
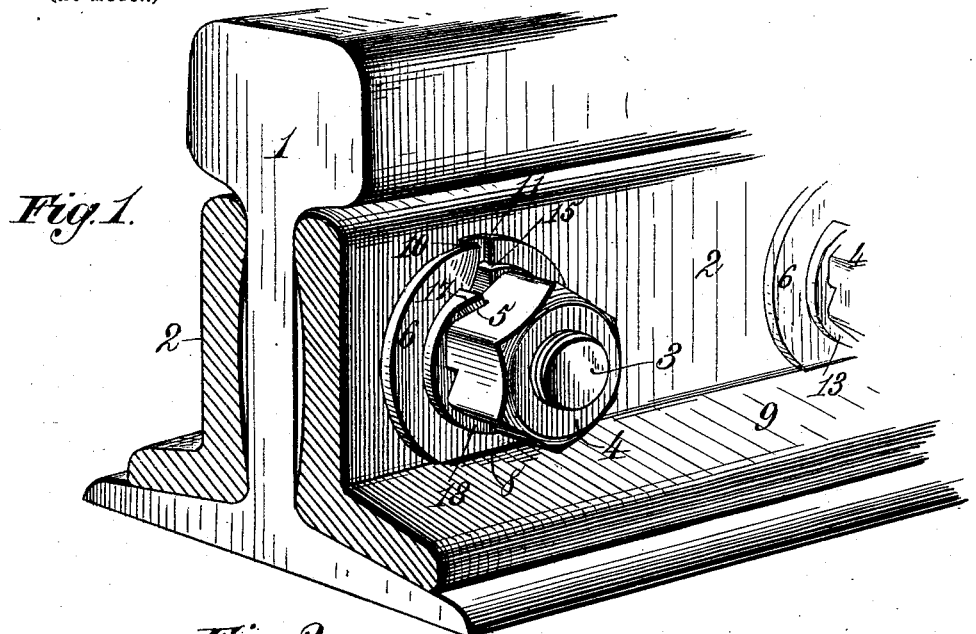
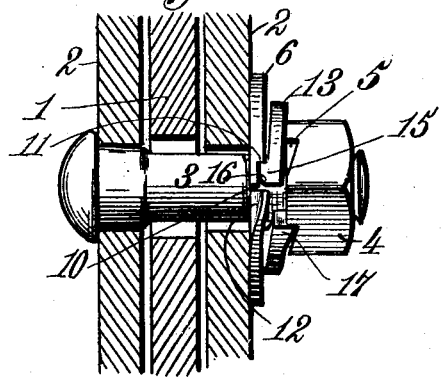
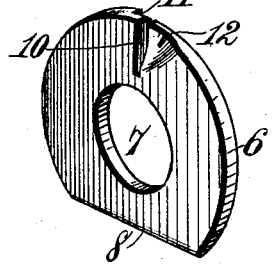
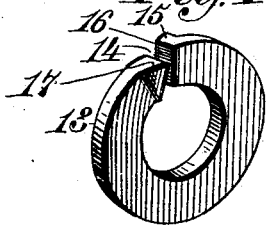
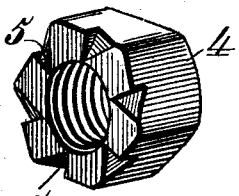
Witnesses. Inventor.
John E. Ward.
By James L. Norris
Atty.
THE NORRIS PETERS CO., PHOTO-LITHO., WASHINGTON, D. C.

UNITED STATES PATENT OFFICE.

JOHN E. WARD, OF WAVERLY, NEW YORK, ASSIGNOR OF SEVEN-EIGHTHS TO GILBERT C. HIGGINS AND EDWIN W. HORTON, OF WAVERLY, NEW YORK.

NUT-LOCK.

SPECIFICATION forming part of Letters Patent No. 688,273, dated December 3, 1901.

Application filed May 14, 1901. Serial No. 60,201. (No model.)

*To all whom it may concern:*

Be it known that I, JOHN E. WARD, a citizen of the United States, residing at Waverly, in the county of Tioga and State of New York, have invented new and useful Improvements in Nut-Locks, of which the following is a specification.

This invention relates to nut-locks, and more particularly to that class of nut-locks designed to be employed in connection with fish-plates for joining together the ends of railway-rails; and it has for its object to provide a simple, strong, and inexpensive nut-lock of improved construction which will operate to lock the nut on the bolt against any possible accidental displacement, which may be easily applied, and which when it becomes necessary may be readily removed from the bolt.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a perspective view of my improved nut-lock, showing the same applied to a railway-rail joint. Fig. 2 is a sectional top plan view of the same, showing the nut locked on the bolt. Fig. 3 is a detail perspective view of the base-washer before the same has been placed on the bolt. Fig. 4 is a similar view of the intermediate split spring-washer, and Fig. 5 is a similar view of the nut.

Referring to the drawings, the numeral 1 indicates a railway-rail, 2 the fish-plates overlapping the webs of the rails, and 3 one of the bolts which pass through the rails and fish-plates and fasten the same together. These parts are made in the ordinary or any suitable or preferred manner. The numeral 4 indicates the nut adapted to be screwed over the threaded end of the bolt 3 and is also constructed in the usual manner, excepting that it is provided on its inner face with radial ratchet-teeth 5. Loosely arranged upon the bolt between the nut and the fish-plate is a base-washer 6, having a central aperture 7, through which the bolt is adapted to loosely pass, and provided at its lower portion with a straight edge 8, that rests against the upper side of the foot 9 of the fish-plate, and thus prevents the washer from turning on the bolt. The base-washer 6 is preferably made of malleable iron, so that it may be bent in the manner hereinafter described, and is non-resilient, so that when bent it will remain in its bent position. Formed in the base-washer 6 is a substantially radial slit or kerf 10, that extends from the outer edge of the washer to a point intermediate said outer edge and the inner edge thereof. Formed on the outer face of the base-washer or that face which is disposed toward the nut is an approximately radial shoulder 11, which is disposed in proximity to the slit 10 in the manner and for the purpose hereinafter explained. The rear or under face of the base-washer, or that face adjacent to the fish-plate, is slightly beveled off at its periphery on one side of the slit 10, as shown at 12.

Loosely arranged on the bolt between the base-washer 6 and the nut 4 is an intermediate spring-washer 13, that is split or divided, as at 14, said washer being slightly volute in form, so that when in place on the bolt and before the nut is screwed up tight one portion of it will lie against the base-washer and the other portion will project toward the ratchet-face of the nut. On one end of the intermediate spring-washer 13 is formed a laterally-projecting lug 15, that is adapted to fit behind and engage the shoulder 11, and the outer end of said lug or that end which engages or bears against the base-washer is beveled, as at 16. The other end of the split spring-washer 13 is provided with a laterally-projecting beveled tooth 17, said tooth being formed on the side of the spring-washer opposite to that on which the lug 15 is formed, so that it will be in position to engage the ratchet-teeth on the nut.

The operation of my improved nut-lock is as follows: The bolt having been passed through the rails and fish-plates and being prevented from turning therein in the usual or any suitable manner, the base-washer 6 is first slipped over the threaded end of the bolt, so that its straight edge 8 will rest against the upper side of the foot 9 of the fish-plate and prevent the washer from turning. The intermediate spring-washer 13 is next slipped on the bolt and pushed up into place until its lug 15 fits behind and engages the shoulder 11 of the base-washer and is thus prevented from turning with the nut when the latter is screwed up. Finally, the nut 4 is placed on the bolt and screwed up tightly against the spring-washer. As the nut is screwed up the tooth 17 yields to permit the ratchet-teeth 5 of the nut to slip idly thereover, and when the nut has been tightly screwed up into place the spring-washer will be compressed between the nut and the base-washer, thus effectually preventing the lug 15 and tooth 17 from becoming disengaged from the shoulder 11 and the ratchet-teeth 4. After the nut has been screwed up into place the end of a suitable wedge-shaped tool is inserted between the fish-plate and the beveled portion 12 of the base-washer and is struck with a hammer, so as to drive that portion of the base-washer on the side of the slit 10 opposite the lug 15 outward away from the fish-plate and behind the end of the said lug. The spring-washer is thus positively locked against turning in a direction to permit the unscrewing of the nut. The shoulder 11 and lug 15 prevent the spring-washer from turning in one direction, and by bending up the base-washer in the manner described the spring-washer is prevented from turning in the opposite direction, and as the tooth 17 engages the ratchet-teeth on the nut the latter is effectually prevented from becoming unscrewed under all circumstances. When it becomes necessary to unscrew and remove the nut—as, for example, to repair or replace the rails—it is only necessary to insert the wedge-shaped tool between the bent portion of the base-washer and the nut and strike it with a hammer to bend the washer back in its original shape and from behind the end of the lug 15. Then the nut may be unscrewed from the bolt, as the spring-washer can then freely turn with the nut. It may sometimes happen that difficulty will be experienced in bending back the washer to its original shape, so as to cause it to completely disengage the end of the lug 15; but by beveling the end or face of said lug in the manner described it is rendered immaterial whether or not the washer be completely and accurately bent back to its original shape, as the inclined face of the lug will readily ride over the slitted edge of the washer if the latter should project slightly beyond the adjacent portion of the washer lying under or behind the lug, so as to permit of the ready removal of the nut. By beveling the under or inner side of the base-washer on one side of the slit 11, as at 12, in the manner before described, the insertion of the tool between said washer and the fish-plate is rendered easy and the bending up of the washer behind the end of the lug to prevent the spring-washer from turning is facilitated, while at the same time said beveled portion of the base-washer may the more readily be bent back from behind the lug to its original position to release the lug.

Having described my invention, what I claim is—

1. In a nut-lock, the combination of a nut, base-washer and an intermediate split spring-washer, said base-washer having means for preventing its turning and having a slit extending from its outer toward its inner portion, and provided with a shoulder adjacent to said slit, and said split spring-washer being provided at one end with a lug arranged to engage said shoulder and at its other end with means for engaging the nut and preventing the latter from turning in one direction, the base-washer being adapted to be bent up at one side of the slit behind the said lug whereby the spring-washer is prevented from turning in either direction, substantially as described.

2. In a nut-lock, the combination with a base-washer having means for preventing its turning and slitted from its outer toward its inner edge, said washer being provided with a shoulder adjacent to the slit, of a nut, and an intermediate split spring-washer provided at one end with a laterally-projecting lug arranged to engage said shoulder to prevent the spring-washer from turning in one direction, the base-washer being adapted to be bent up behind the end of the lug to prevent the spring-washer from turning in the opposite direction, and means carried by the free end of the spring-washer arranged to engage the nut and prevent the latter from unscrewing, substantially as described.

3. In a nut-lock, the combination with a base-washer having means for preventing its turning and slitted from its outer toward its inner edge, said washer being provided with a shoulder adjacent to the slit, of a nut, and an intermediate split spring-washer provided at one end with a laterally-projecting lug arranged to engage said shoulder to prevent the spring-washer from turning in one direction, the base-washer being adapted to be bent up behind the end of the lug to prevent the spring-washer from turning in the opposite direction, the face of said lug being beveled, and means carried by the free end of the spring-washer arranged to engage the nut and prevent the latter from unscrewing, substantially as described.

4. In a nut-lock, the combination with a base-washer provided with means for preventing its turning and slitted from its outer toward its inner edge, said washer being provided on one face with a shoulder adjacent to the slit, and beveled on the opposite face and side of said slit, of a nut, and an intermediate split spring-washer provided at one end with a laterally-projecting lug arranged to engage said shoulder to prevent the spring-washer from turning in one direction, the beveled portion of said washer being adapted to be bent up behind the end of the lug to prevent the spring-washer from turning in the opposite direction, and means carried by the free end of the spring-washer arranged to engage the nut and prevent the latter from unscrewing, substantially as described.

5. In a nut-lock, the combination with a base-washer having a lower straight edge and slitted from its outer toward its inner edge, said washer being provided with a shoulder adjacent to the slit, of a nut provided on its inner side with ratchet-teeth and an intermediate volute split spring-washer provided at one end with a laterally-projecting lug arranged to engage said shoulder to prevent the spring-washer from turning in one direction, the base-washer being adapted to be bent up at one side of the slit behind the end of the lug to prevent the spring-washer from turning in the opposite direction, and a laterally-projecting beveled tooth on the free end of the spring-washer arranged to engage the ratchet-teeth of the nut and prevent the latter from unscrewing, substantially as described.

In testimony whereof I have hereunto set my hand in presence of two subscribing witnesses.

JOHN E. WARD.

Witnesses:
JAMES L. NORRIS,
GEO. W. REA.